3,830,916
POLYCYCLIC PIPERAZINO PENTANONE
COMPOSITIONS
Melvin Harris Rosen, Florham Park, N.J., assignor to
Ciba-Geigy Corporation, Ardsley, N.Y.
No Drawing. Filed Aug. 12, 1971, Ser. No. 176,389
Int. Cl. A61k 27/00
U.S. Cl. 424—250     3 Claims

ABSTRACT OF THE DISCLOSURE

2 - amino - 2,3 - polycyclo - 4,5-diaryl-cyclopentanones, e.g. those of the formula

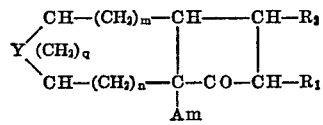

$R_{1,2}$=isocyclic aryl
Am=piperazino, $q=1$ or 2
Y=$p,(p+1)$-alkylene or 1,2-[cyclopent(en)ylene or phenylene]
$p=1$ to 3, $m+n=0$ to 2 the 4,5-dehydro-derivatives or salts thereof are antifertility agents.

BACKGROUND OF THE INVENTION

J. Ciabattoni et al. [J. Org. Chem. 31, 1336 (1966)] describe a cycloaddition reaction of diphenylcyclopropenone with enamines, e.g. 1-pyrrolidinocyclopentene or -hexene, to yield both, bicyclic and macrocyclic ketones, e.g. 1,3 - diphenyl - 2,3,3a,4,5,6 - hexahydro - 2 - pentalenone (14) and 2,9 - diphenyl - 3 - pyrrolidinocyclonona-2,8-dienone (11) respectively. Surprisingly, the bicyclic enamine, e.g. 2-pyrrolidinobicyclo[2.2.1]hept-2-ene, used in the process of the present invention, yields with diphenylcyclopropenone an addition product, which is dissimilar to that obtained by Ciabattoni et al. with the corresponding monocyclic enamine, i.e. it does not share the structural or other properties of said known products. This may be depicted as follows:

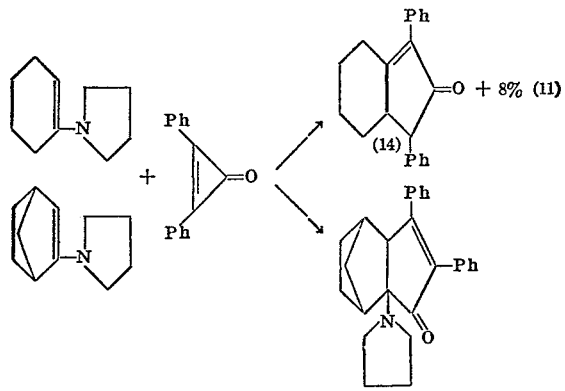

SUMMARY OF THE INVENTION

The present invention concerns and has for its object the provision of new addition products of diarylcyclopropen(thi)ones to polycyclic enamines, more particularly of those corresponding to Formula I

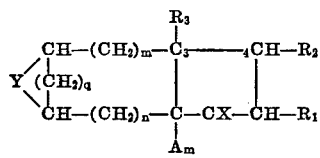

in which Am is a tertiary amino group, X is oxygen or sulfur, each of $R_1$ and $R_2$ is an iso- or heterocyclic aryl radical, $R_3$ is hydrogen or lower alkyl, Y is a $p,(p+1)$-lower alkylene or 1,2-(cyclopentylene, cyclopentenylene or phenylene) radical, $p$ is an integer from 1 to 3, $q$ is the integer 1 or 2 and the sum $m+n$ is an integer from 0 to 2, the 4,5-dehydro-derivatives or salts thereof, of corresponding pharmaceutical compositions and of methods for the preparation and application of these products, which exhibit antifertility effects in females.

DESCRIPTION OF THE PREFERRED EMBODIMENT

In the above Formula I, the tertiary amino group Am is preferably di-lower alkylamino, e.g. dimethylamino, N-methyl-N-ethylamino, di-ethylamino, di-n-propylamino, di-isopropylamino or di-n-butylamino; or advantageously lower alkyleneimino, e.g. pyrrolidino, 2-methyl-pyrrolidino, piperidino, 2- or 4-methyl-piperidino, 1,6- or 2,5-hexyleneimino, 1,7- or 2,6-heptyleneimino; but also, for example, monooxa-, monothia- or monoaza-lower alkyleneimino, e.g. morpholino, 3-methyl-morpholino or thiamorpholino, piperazino, 4-(methyl, ethyl, n-propyl or i-propyl)-piperazino, 3-(methyl, ethyl or n-propyl)-3-aza-1,5- or 1,6-hexyleneimino or 4-methyl-4-aza-1,7- or 2,6-heptyleneimino. In the above heterocyclic amino groups two heteroatoms are separated from each other by at least 2 carbon atoms. The term "lower" referred to above and hereinafter in connection with organic radicals or compounds respectively, defines such with up to 7, preferably up to 4, carbon atoms.

The iso- or heterocyclic aryl radicals $R_1$ and $R_2$ are preferably monocyclic, isocyclic or monothia- or monoazacyclic aryl radicals. These, as well as the 1,2-phenylene radical Y, are unsubstituted or substituted by one or more than one, preferably by 1 or 2, of the same or of different substituents, for example, by lower alkyl, such as methyl, ethyl, n- or i-propyl or -butyl; free, etherified or esterified hydroxy or mercapto groups, such as lower alkoxy, e.g. methoxy, ethoxy, n- or i-propoxy or -butoxy; lower alkylmercapto, e.g. methyl- or ethylmercapto; Am-lower alkoxy wherein Am has the above meaning and is separated from the oxygen atom by at least 2 carbon atoms, e.g. 2-dimethylaminoethoxy or -propoxy, or 3-pyrrolidinopropoxy; halogeno, e.g. fluoro, chloro or bromo; trifluoromethyl; nitro; amino or di-lower alkylamino, e.g. dimethylamino or diethylamino.

Preferred aryl radicals $R_{1,2}$ or 1,2-phenylene groups Y are phenyl or 1,2-phenylene, (lower alkyl)-phenyl or -1,2-phenylene, (lower alkoxy)-phenyl or -1,2-phenylene, (lower alkylmercapto)-phenyl or -1,2-phenylene, (Am-lower alkoxy)-phenyl or -1,2-phenylene, (halogeno)-phenyl or -1,2-phenylene, (trifluoromethyl)-phenyl or -1,2-phenylene, (nitro)-phenyl or -1,2-phenylene, (amino)-phenyl or -1,2-phenylene, (di-lower alkylamino)-phenyl or -1,2-phenylene; thienyl, (lower alkyl)-thienyl, pyridyl or (lower alkyl)-pyridyl.

An alkyl group $R_3$ is preferably methyl, but also, for example, ethyl, n-propyl or -butyl.

A $p,(p+1)$-lower alkylene radical Y is preferably 1,2-ethylene, but also, for example, 1,2-propylene, 1,2- or 2,3-butylene, -pentylene, -hexylene or -heptylene or 3,4-hexylene or -heptylene.

The compounds of the invention exhibit valuable pharmacological properties. Primarily, they show nidation inhibitory effects, weak estrongenic activity and deciduoma inhibitory effects. This can be demonstrated, for example, in animal tests, using advantageously mammals, e.g. rats, hamsters or rabbits, as test objects. The compounds of the invention can be administered enterally or parenterally, advantageously orally, for example, in the form of aqueous solutions or suspensions in a dosage range between about 1 and 150 mg./kg./day, preferably between about 5 and 50 mg./kg./day, advantageously at about 25 mg./kg./day. Said antifertility effects are estimated by placing adult estrous female rats with males for 4 hours and designating those females pregnant at day 0, which exhibit spermatozoa in vaginal smears. On days 1–9, the compounds of the invention are administered once daily by stomach tube. The rats are sacrificed on day 10 or 11 and their uterus examined for living and dead fetuses, resorbed fetuses and implantation sites and compared to that of control animals, obtaining the liquid vehicle by stomach tube only. Thus, for example, when 2,3-diphenyl-7a-piperidino-3a,4,5,6,7,7a-hexahydro-4,7-methanoindene-1-one, a characteristic compound of this invention, is administered in the above manner at a dosage level down to 5 mg./kg./day, little or no living fetuses are found in the uterus of the medicated animals, as compared with an average of 11 found in that of the control animals. The same effect is also observed by applying said compound on days 1, 3, 5 or 6–9 only at a dose of 25 mg./kg./day. Peripheral or central estrogenic effects are estimated according to classical tests, e.g. by vaginal opening and uterotrophy of weanling rats, vaginal cornification of ovariectomized and estradiol primed rats, inhibition of ovulation in estrous or metestrous rats, depression of ovarian weight in intact rats etc. The inhibition of deciduoma formation is estimated by inducing pseudopregnancy in adult estrous rats via electrical stimulation of the cervix. Four days later the uterine lumen is scratched with a barbed needle and the compounds of the invention administered orally at said dosages days 4–8. On day 9 the uteri are weighed and compared with those of untreated traumatized or non-traumatized pseudopregnant control rats. Accordingly, the compounds of the invention are useful as orally applicable antifertility agents. They also are useful intermediates in the manufacture of other valuable products, particularly of pharmacologically active agents.

Valuable compounds are those of Formula I, in which Am is di-lower alkylamino, lower alkyleneimino or monooxa-, monothia or monoaza-lower alkyleneimino, X is oxygen or sulfur, each of $R_1$ and $R_2$ is unsubstituted phenyl, thienyl or pyridyl or such radicals substituted by up to two members selected from lower alkyl, hydroxy, lower alkoxy, lower alkylmercapto, Am-lower alkoxy, halogeno, trifluoromethyl, nitro, amino or di-lower alkylamino, $R_3$ is hydrogen or lower alkyl, Y is $p,(p+1)$-lower alkylene, 1,2-cyclopentylene, 1,2-cyclopentenylene, unsubstituted 1,2-phenylene or 1,2-phenylene substituted by up to two members selected from lower alkyl, hydroxy, lower alkoxy, lower alkylmercapto, Am-lower alkoxy, halogeno, trifluoromethyl, nitro, amino or di-lower alkylamino, $p$ is an integer from 1 to 3, $q$ is 1 or 2 and the sum $m+n$ is an integer from 0 to 2, in which compounds two heteroatoms in aliphatic moieties are separated from each other by at least 2 carbon atoms, the 4,5-dehydro derivatives or therapeutically useful salts thereof.

Particularly useful are compounds of Formula I, in which Am is di-lower alkylamino, lower alkyleneimino or monooxa-, monothia- or monoaza-lower alkyleneimino, X is oxygen or sulfur, each of $R_1$ and $R_2$ is phenyl (lower alkyl)-phenyl, (lower alkoxy)-phenyl, (lower alkylmercapto)-phenyl, (Am-lower alkoxy)-phenyl, (halogeno)-phenyl, (trifluoromethyl)-phenyl, (nitro)-phenyl, (amino)-phenyl, (di-lower alkylamino)-phenyl, thienyl, (lower alkyl)-thienyl, pyridyl or (lower alkyl)-pyridyl, $R_3$ is hydrogen or methyl, Y is $p,(p+1)$-lower alkylene, 1,2-cyclopentylene, 1,2-cyclopentenylene, 1,2-phenylene, (lower alkyl) - 1,2 - phenylene, (lower alkoxy) - 1,2 - phenylene, (lower alkylmercapto)-1,2-phenylene, (Am-lower alkoxy)-1,2-phenylene, (halogeno)-1,2-phenylene, (trifluoromethyl)-1,2-phenylene, (nitro)-1,2-phenylene, (amino)-1,2-phenylene, or (di-lower alkylamino)-1,2-phenylene, $p$ is an integer from 1 to 3, $q$ is 1 or 2 and the sum $m+n$ is the integer 0 or 1, in which compounds two heteratoms in aliphatic moieties are separated from each other by at least 2 carbon atoms, the 4,5-dehydro derivatives or therapeutically useful acid addition salts thereof.

Outstanding are those compounds of Formula I, in which Am is lower alkyleneimino, morpholino, thiamorpholino or 4-lower alkyl-piperazino, X is oxygen, each of $R_1$ and $R_2$ is phenyl, tolyl, anisyl, chlorophenyl, or thienyl, $R_3$ is hydrogen or methyl, Y is 1,2-(ethylene, cyclopentylene, cyclopentenylene or phenylene), $q$ is 1 and the sum $m+n$ is the integer 0 or 1, the 4,5-dehydro derivatives or therapeutically useful acid addition salts thereof.

Most preferred compounds of the invention are those of Formula II

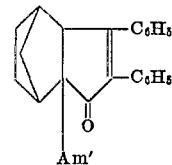

(II)

in which Am' is pyrrolidino, piperidino or 1,6-hexyleneimino or therapeutically useful acid addition salts thereof.

The compounds of the invention are surprisingly obtained by reacting the corresponding polycyclic enamine with a diarylcyclopropen(thi)one, i.e. those of the formulae

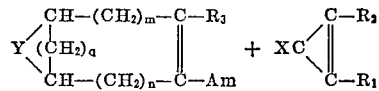

and, if desired, hydrogenating the resulting 4,5-dehydro-derivative or converting any resulting compound into another compound of the invention.

The above addition reaction usually proceeds exothermically, but additional heating can be applied. The resulting 4,5-dehydro-derivative or any nitro-compound obtained, can be hydrogenated according to known methods, for example, with the use of catalytically activated hydrogen, e.g. hydrogen in the presence of nickel, palladium or preferably platinum catalysts, in order to obtain the saturated or amino-compounds respectively.

The above-mentioned reactions are carried out according to standard methods, in the presence or absence of diluents, preferably such as are inert to the reagents and are solvents thereof, of catalysts and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, such as hydrohalic, e.g. hydrochloric or hydrobromic acid, sulfuric acid, phosphoric, nitric, or perchloric acid, aliphatic, alicyclic araliphatic, aromatic or heterocyclic carboxylic or sulfonic acids, such as formic, acetic, propionic, succinic, glycolic, lactic, malic, tartaric, citric, ascorbic, maleic, hydroxymaleic, pyroracemic, phenylacetic, benzoic, aminobenzoic, anthranilic, hydroxy-benzoic, salicylic, aminosalicylic, embonic, nicotinic, methanesulfonic, ethanesulfonic, hydroxyethanesulfonic, ethylenesulfonic, halobenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free compound is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the reactions of the invention that lead to the formation of those compounds indicated above as being specially valuable.

The starting materials used are known, or, if new, may be prepared analogous to the methods used for the known compounds. For example, diarylcyclopropenones are prepared according to the method described in J. Am. Chem. Soc., 92, 149 (1970), the corresponding thiones are prepared according to the method described in J. Org. Chem., 35 716 (1970), and the bicyclic enamines are obtained by the methods mentioned in J. Org. Chem., 31, 14 (1966) or ibid., 34, 2535 (1969).

The pharmacologically active compounds of the invention are useful in the manufacture of pharmaceutical compositions comprising an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also, (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solutions promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

Example 1

The solution of 8.0 g. of 2-pyrrolidinobicyclo[2.2.1]hept-2-ene in 40 ml. of benzene is added dropwise to the solution of 8.0 g. of diphenylcyclopropenone in 40 ml. of benzene while stirring under nitrogen and allowing the temperature to rise to about 60°. After 24 hours the mixture is filtered, the filtrate evaporated, the residue triturated with diethyl ether and recrystallized from tetrahydrofuran-diethyl ether, to yield the 2,3-diphenyl-7a-pyrrolidino - 3a,4,5,6,7,7a-hexahydro-4,7-methanoindene-1-one of the formula

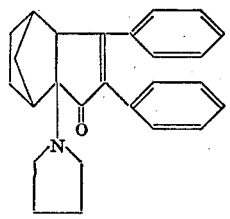

melting at 194–196°.

Example 2

The solution of 3.5 g. of 2-piperidinobicyclo[2.2.1]hept-2-ene in 10 ml. of benzene is added dropwise to the solution of 3.0 g. of diphenylcyclopropenone in 10 ml. of benzene while stirring under nitrogen. The mixture is refluxed for about two hours, stirred at room temperature overnight and evaporated. The residue is triturated with diethyl ether-hexane and recrystallized from ethyl acetate, to yield the 2,3-diphenyl-7a-piperidino-3a,4,5,6,7,7a-hexahydro - 4,7 - methanoindene-1-one of the formula

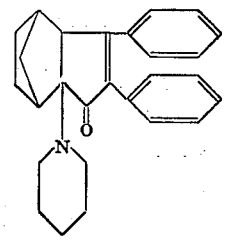

melting at 159–160°.

In an analogous manner the 2,3-diphenyl-7a-hexamethyleneimino-3a,4,5,6,7,7a - hexahydro - 4,7 - methanoindene-1-one, m.p. 172–173.5° and the 2,3-diphenyl-7a-morpholino-3a,4,5,6,7,7a-hexahydro - 4,7-methanoindene-1-one, m.p. 217–218°, are prepared.

Example 3

The solution of 2.8 g. of 2-pyrrolidinobicyclo[2.2.1]hept-2-ene in 15 ml. of benzene is added to the mixture of 2.0 g. of diphenylcyclopropenthione in 15 ml. of benzene while stirring under nitrogen. The mixture is heated to 65° for two hours and stirred overnight at rooom temperature. It is evaporated under reduced pressure, the residue triturated with diethyl ether-ethanol and recrystallized from hexane, to yield the 2,3-diphenyl-7a-pyrrolidino-3a,4,5,6,7,7a-hexahydro - 4,7 - methanoindene-1-thione of the formula

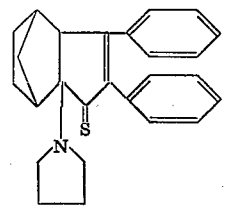

melting at 151–153°.

Example 4

The mixture of 2 g. of 2,3-diphenyl-7a-pyrrolidino-3a,4,5,6,7,7a-hexahydro-4,7-methanoindene-1-one, 9 ml. of tetrahydrofuran, 75 ml. of ethyl acetate and 0.5 g. of platinum oxide is hydrogenated at 50° until the hydrogen uptake ceases. It is filtered, the filtrate evaporated, and the residue recrystallized from ethyl acetate-ethanol, to yield the 2,3 - diphenyl-7a-pyrrolidino-2,3,3a,4,5,6,7,7a-octahydro-4,7-methanoindene-1-one of the formula

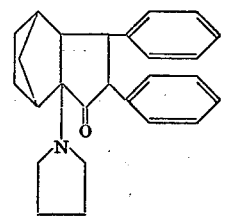

melting at 194–196°.

Example 5

The solution of 4.5 g. of 2-(4-methylpiperazino)-bicyclo[2.2.1]hept-2-ene in 50 ml. of benzene is added dropwise to the solution of 3.9 g. of diphenylcyclopropenone in 50 ml. of benzene while stirring under nitrogen. After refluxing for 3 hours the mixture is evaporated and the residue chromatographed on 150 g. of neutral aluminum oxide. The column is eluated with (a) 1 lt. of hexane, (b) 800 ml. of 15% diethyl ether in hexane, (c) 600 ml. of 50% diethyl ether in hexane and (d) 800 ml. of diethyl ether. Fractions (c) and (d) are combined, evaporated and the residue recrystallized from diethyl ether-hexane, to yield the 2,3-diphenyl 7a-(4-methylpiperazino) - 3a,4,5,6,7,7a-hexahydro-4,7-methanoindene-1-one of the formula

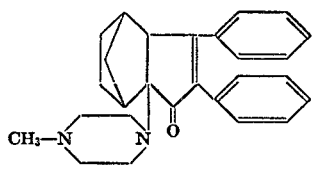

melting at 110–112°.

Example 6

The mixture of 2.8 g. of 2-pyrrolidinobicyclo[2.2.1]hept-2-ene, 2.5 g. of dianisylcyclopropenone and 40 ml. of benzene is stirred under nitrogen at 65° for two hours and at room temperature for 14 hours. It is evaporated, the residue trituated with diethyl ether-hexane and recrystallized from diethyl ether-tetrahydrofuran, to yield the 2,3-dianisyl-7a-pyrrolidino - 3a,4,5,6,7,7a-hexahydro-4,7-methanoindene-1-one of the formula

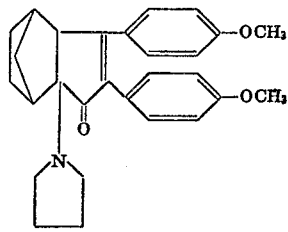

melting at 147–149°.

In an analogous manner the 2,3-di-(4-chlorophenyl)-7a - pyrrolidino-3a,4,5,6,7,7a-hexahydro - 4,7-methanoindene-1-one, m.p. 209–210°; the 2,3-di-(4-chlorophenyl)-7a-piperidino-3a,4,5,6,7,7a-hexahydro-4,7 -methanoindene 1-one, m.p. 166–168°, and the 2,3-(3-nitrophenyl)-7a-pyrrolidino-3a,4,5,6,7,7a-hexahydro-4,7 - methanoindene-1-one, m.p. 183–184° (dec.), are obtained.

Example 7

The solution of 1.8 g. of 2-piperidinobicyclo[2.2.1]hept-2-ene in 10 ml. of benzene is added dropwise to the solution of 3.9 g. di-(2-thienyl)-cyclopropenone while stirring under nitrogen. After stirring for two hours at 40° the mixture is chromatographed on 50 g. of diatomaceous earth. The column is eluated with 500 ml. of hexane and 800 ml. of 25% diethyl ether in hexane. The latter fraction is evaporated and the residue recrystallized from tetrahydrofuran-diethyl ether, to yield the 2,3-di-(2-thienyl)-7a-piperidino - 3a,4,5,6,7,7a - hexahydro-4,7-methanoindene-1-one of the formula

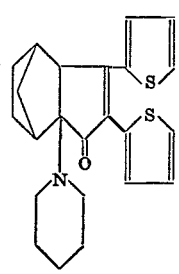

melting at 170–171.5°.

Example 8

The solution of 7.0 g. of 5-pyrrolidino-2,3,3a,4,7,7a-tetrahydro-4,7-methanoindene in 25 ml. of benzene is added dropwise to the solution of 3.5 g. of 2,3-diphenylcyclopropenone in 20 ml. of benzene while stirring under nitrogen. The mixture is stirred at 65° for three hours and at room temperature overnight. It is evaporated, the residue triturated with ethanol-diethyl ether and recrystallized from ethyl acetate, to yield the 2,4-diphenyl-8a-pyrrolidino-3a,4,4a,5,6,7a,8,8a - octahydro-4,8-methano-s-indazene-1-one of the formula

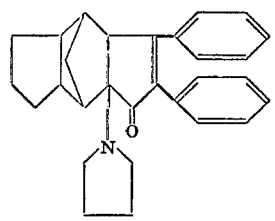

melting at 182–183°.

In an analogous manner the 2,3 - diphenyl - 8a - pyrrolidino - 3a,4,4a,7a,8,8a - hexahydro - 4,8 - methano - s-indazene-1-one is obtained, m.p. 205–207°.

Example 9

The solution of 5.0 g. of 7 - pyrrolidino - 6,9-dihydro-5,9 - methano - 5H - benzocycloheptene in 15 ml. of benzene is added dropwise to the solution of 2.7 g. of diphenylcyclopropenone in 15 ml. of benzene while stirring under nitrogen. After two hours the mixture is refluxed one hour and stirred overnight at room temperature. It is evaporated, the residue chromatographed on 160 g. of neutral aluminum oxide and the column eluated with 1 lt. of hexane and 500 ml. of hexane-diethyl ether (1:1). The latter fraction is evaporated and the residue recyrstallized from ethyl acetate-hexane, to yield the 2,3-diphenyl-10a - pyrrolidino - 3a,9,10,10a - tetrahydro - 4,9-methano benz[f]azulene-1-one of the formula

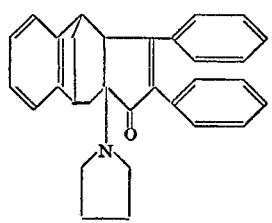

melting at 169–170°.

Example 10

The solution of 1.45 g. of 3 - methyl - 2 - pyrrolidinobicyclo[2.2.1]hept - 2 - ene in 10 ml. of benzene is added dropwise to the solution of 1.55 g. of diphenylcyclopropenone in 15 ml. of benzene while stirring under nitrogen. The mixture is stirred at 60° for 95 minutes and at room temperature overnight. It is filtered and the residue recrystallized twice from tetrahydrofuran-diethyl ether, to yield the 2,3 - diphenyl - 3a - methyl-7a-pyrrolidino-3a,4,5,6,7,7a - hexahydro - 4,7 - methanoindene-1-one of the formula

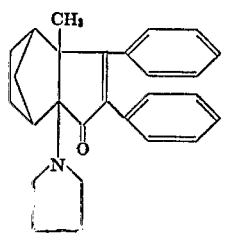

melting at 148–149°.

Example 11

The mixture of 4.0 g. 2-piperidinobicyclo[2.2.2]oct-2-ene, 3.3 g. of diphenylcyclopropenone and 55 ml. of benzene is refluxed for 24 hours and stirred overnight at room temperature. It is evaporated, the residue triturated with diethyl ether and recrystallized from ethyl acetate-hexane, to yield the 2,3 - diphenyl - 7a - piperidino - 3a,4,5,6,7,7a-hexahydro - 4,7 - ethanoindene-1-one of the formula

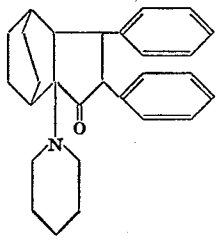

melting at 175–178°.

Example 12

The mixture of 4.5 g. of 3 - piperidinobicyclo[3.2.1]oct-2-ene, 45 ml. of benzene and 3.7 g. of diphenylcyclopropenone is refluxed for 48 hours and evaporated. The residue is triturated with hexane-ethyl acetate and chromatographed on 100 g. of neutral aluminum oxide. The column is eluated with 1 lt. of hexane, the eluate evaporated and the residue recrystallized from diethyl ether, to yield the 2,3 - diphenyl - 8a - piperidino - 3a,4,5,7,8,8a-hexahydro - 4,7 - methano - 6H - azulene - 1 - one of the formula

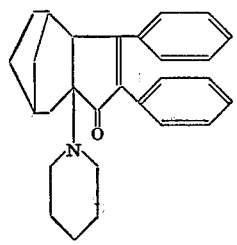

melting at 147–149°.

Example 13

The mixture of 4.0 g. of 2 - pyrrolidinobicyclo[3.2.1]oct-2-ene, 45 ml. of benzene and 4.15 g. of diphenylcyclopropenone is heated to 65° for two hours and stirred overnight at room temperature. It is evaporated, the residue triturated with diethyl ether-ethanol and recrystallized from ethanol, to yield the 2,3-diphenyl-8a-pyrrolidino-3a,4,5,7,8,8a - hexahydro - 5,8-methano-6H-azulene-1-one of the formula

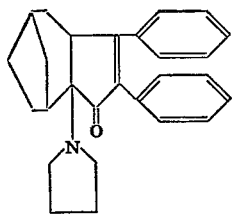

melting at 174–176°.

Example 14

Preparation of 10,000 tablets each containing 50 mg. of the active ingredient:

Formula:

| | G. |
|---|---|
| 2,3 - diphenyl - 7a-piperidino-3a,4,5,6,7,7a-hexahydro-4,7-methanoindene-1-one | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure: All the powders are passed through a screen with openings of 0.6 mm. Then the active ingredient, lactose, talcum, magnesium stearate and half of the starch are mixed in a suitable mixer. The other half of the starch is suspended in 45 ml. of water and the suspension added to the boiling solution of the polyethylene glycol in 180 ml. of water. The paste formed is added to the powders which are granulated, if necessary, with an additional amount of water. The granulate is dried overnight at 35°, broken on a screen with 1.2 mm. opening and compressed into tablets, using concave punches with 7.1 mm. diameter, uppers bisected.

I claim:

1. A pharmaceutical antifertility composition for females, comprising a fertility suppressing amount of a compound of the formula

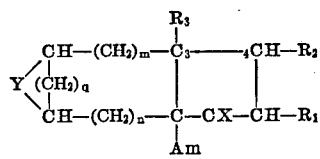

in which Am is 4-lower alkylpiperazino, X is oxygen or sulfur, each of $R_1$ and $R_2$ is unsubstituted phenyl, or phenyl substituted by up to two members selected from lower alkyl, hydroxy, lower alkoxy, lower alkylmercapto, Am-lower alkoxy, halogeno, trifluoromethyl, nitro, amino or di-lower alkylamino, $R_3$ is hydrogen or lower alkyl, Y is $p,(p+1)$-lower alkylene, 1,2-cyclopentylene, 1,2 - cyclopentenylene, unsubstituted 1,2-phenylene or 1,2-phenylene substituted by up to two members selected from lower alkyl, hydroxy, lower alkoxy, lower ankylmercapto, Am-lower alkoxy, halogeno, trifluoromethyl, nitro, amino or di-lower alkylamino, $p$ is an integer from 1 to 3, $q$ is 1 or 2 and the sum $m+n$ is an integer from 0 to 2, the 4,5-dehydro derivatives or therapeutically useful salts thereof, together with a pharmaceutical excipient.

2. A pharmaceutical composition as claimed in claim 1, wherein the effective compound is that of the formula

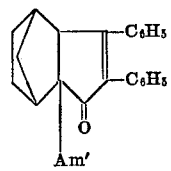

in which Am' is 4-(methyl, ethyl, n-propyl or i-propyl)-piperazino, or a therapeutically useful acid addition salt thereof.

3. A pharmaceutical composition as claimed in claim 2, wherein the effective compound is the 2,3-diphenyl-7α-(4-methyl-piperazino) - 3a,4,5,6,7,7a-hexahydro-4,7-methanoindene-1-one.

References Cited

UNITED STATES PATENTS 2,479,744   8/1949   Hoffmann et al. _____ 260—293

OTHER REFERENCES

Chem. Abst., 8th Collective (1967–1971), p. 12532S.

SAM ROSEN, Primary Examiner

U.S. Cl. X.R.

424—267